United States Patent [19]
Gandrud

[11] 3,922,793
[45] Dec. 2, 1975

[54] LAND MEASURING INSTRUMENT
[76] Inventor: Ebenhard S. Gandrud, P.O. Box 528, Owatonna, Minn. 55060
[22] Filed: Oct. 29, 1974
[21] Appl. No.: 518,238

[52] U.S. Cl. ............................................. 33/141 E
[51] Int. Cl.² .......................................... G01B 3/12
[58] Field of Search ............... 403/102, 85; 15/144; 16/115; 33/141, 141.5, 142; 235/95 R, 95 B

[56] References Cited
UNITED STATES PATENTS
2,716,819   9/1955   Staples ............................ 33/141 E FOREIGN PATENTS OR APPLICATIONS
654,057    1/1965   Belgium ........................... 33/141 E
934,976    7/1949   Germany ........................... 33/141 R
347,643    8/1960   Switzerland ....................... 33/141 R
1,301,588  9/1961   France ............................ 403/102

OTHER PUBLICATIONS
"Popular Mechanics," 4/51, p. 111.

Primary Examiner—Harry N. Haroian
Attorney, Agent, or Firm—Merchant, Gould, Smith, Edell, Welter & Schmidt

[57] ABSTRACT

A ground-engaging wheel of given diameter guided and impelled over the ground by a handle-equipped elongated shank, and having a counter for measuring the distance traversed by the wheel. The shank includes a plurality of shank sections connected together for movement between aligned operative positions and collapsed inoperative storage positions. The diameter of the wheel and length and shape of the shank sections are such that the shank sections are disposed within a circle described by the outer circumference of the wheel when the shank is in its inoperative collapsed position. Connections between the shank sections releasably lock the sections in their aligned operative positions.

7 Claims, 8 Drawing Figures

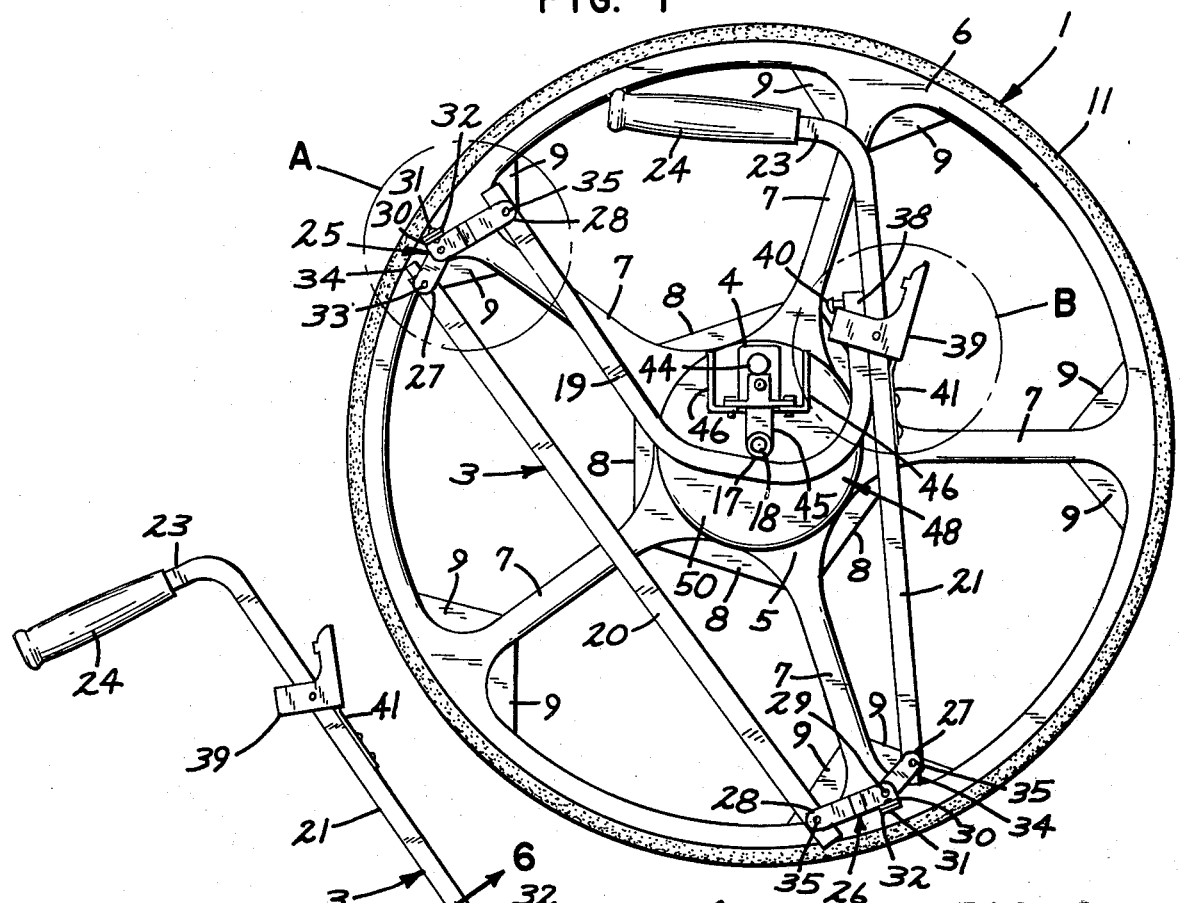
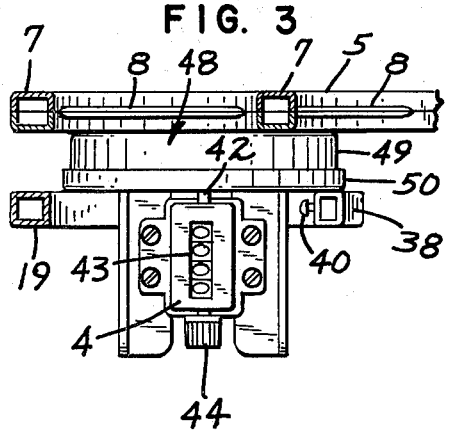
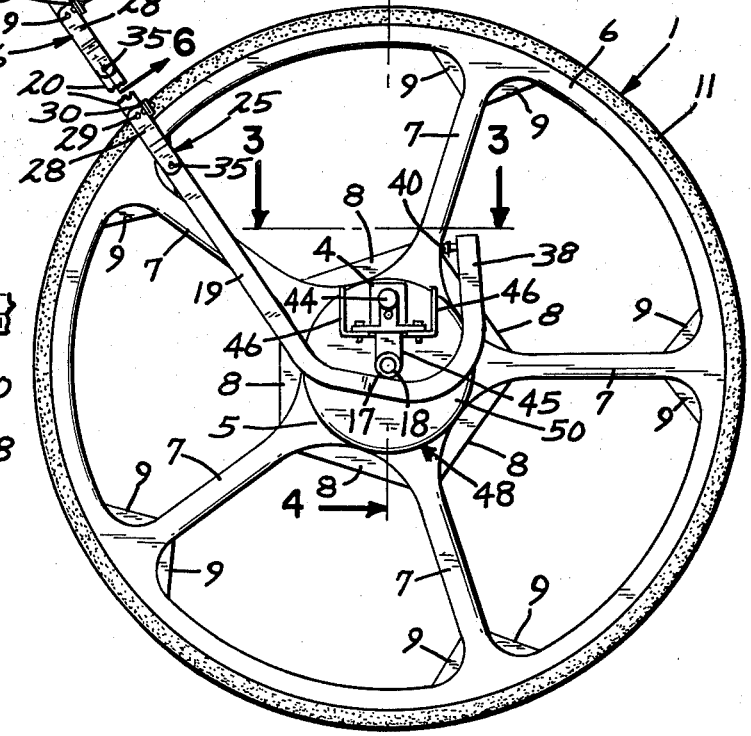

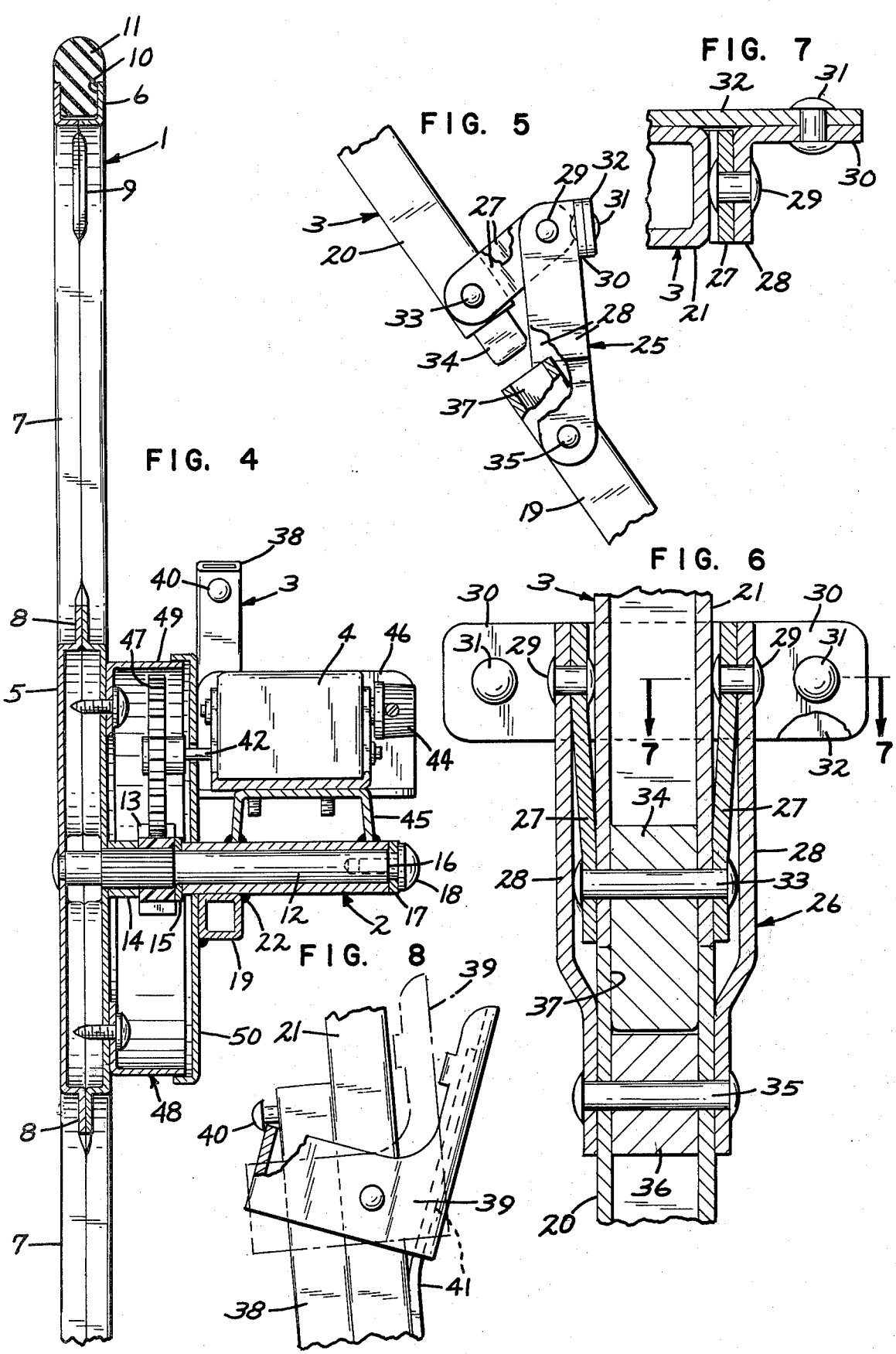

3,922,793

LAND MEASURING INSTRUMENT

This invention relates generally to land measuring apparatus, and more specifically to land measuring wheels; being in the nature of an improvement over structures of the type disclosed in my prior U.S. Pat Nos. 2,121,867 and 2,600,865.

An important object of this invention is the provision of a land measuring instrument having portions which may be collapsed or folded when not in use to permit the storage of the instrument in a limited space.

Another object of this invention is the provision of a land measuring wheel which may be quickly and easily unfolded for use, having connecting and locking devices for rigidly locking the parts in their operative positions.

Still another object of this invention is the provision of a land measuring wheel which is highly accurate and efficient in operation, and which is rugged in construction and durable in use.

To these ends, I provide a measuring wheel of given diameter, a body in which the wheel is journaled for rotation, a counter carried by the body, an actuator operatively connected to the wheel for operating the counter, a handle-equipped elongated shank connected to the body and including at least a pair of rigid shank sections in end-to-end relationship, links connecting adjacent ends of the shank sections together for movements of the sections between operative positions in alignment with each other and inoperative folded or collapsed positions angularly displaced from the aligned positions, and means for locking the sections in their aligned positions. Each of the shank sections is of a length and shape to be fully disposed within the circle described by the outer circumference of the wheel when the shank is collapsed or folded, so that the instrument may occupy relatively small space during shipment or storage.

BRIEF DESCRIPTION OF THE DRAWINGS

FIG. 1 is a view in side elevation of a land measuring instrument produced in accordance with this invention with some of the parts thereof disposed in an inoperative folded position;

FIG. 2 is a view corresponding to FIG. 1 on a reduced scale, showing a different position of some of the parts, some parts being broken away;

FIG. 3 is an enlarged fragmentary view, partly in top plan and partly in section, taken on the line 3—3 of FIG. 2;

FIG. 4 is an enlarged fragmentary vertical section taken on the line 4—4 of FIG. 2;

FIG. 5 is an enlarged fragmentary detail of the portion of FIG. 1 enclosed in the broken line circle A, showing a different position of some of the parts, some parts being broken away and some parts being shown in section;

FIG. 6 is a greatly enlarged fragmentary section taken on the line 6—6 of FIG. 2;

FIG. 7 is a fragmentary section, taken on the line 7—7 of FIG. 6; and

FIG. 8 is an enlarged fragmentary detail corresponding to that portion of FIG. 1 enclosed by the broken line circle B.

DETAILED DESCRIPTION OF THE PREFERRED EMBODIMENT

The land measuring instrument of this invention comprises a ground-engaging wheel 1, a body in the nature of a tubular bearing 2, wheel impelling and guiding means in the nature of an elongated shank 3, and a distance indicator or counter 4.

The wheel 1 is preferably stamped from sheet metal to provide a pair of opposed like wheel sections that cooperate to define a central hub 5, an outer rim 6 and a plurality of circumferentially spaced radial spokes 7 connecting the hub 5 and rim 6. Inner and outer webs 8 and 9 respectively provide portions at which the wheel sections are joined by suitable means, such as spot welding or the like. The rim 6 defines a radially outwardly opening circumferential channel 10 in which is mounted a ground-engaging tire 11 preferably made from rubber or other suitable material.

A spindle 12 is rigidly mounted in the wheel hub 5, and projects axially therefrom, being journaled in the tubular bearing 2. The wheel hub 5 is axially spaced from the adjacent end of the body or bearing 2 by a toothed pinion 113 splined or otherwise rigidly mounted on the spindle 12, a spacer 14 between the pinion 13 and hub 5, and a washer 15 intermediate the pinion 13 and tubular bearing 2. At its outer end, the spindle 12 is formed to provide a shoulder 16 against which rests a thrust washer 17 that also engages the adjacent end of the tubular bearing or body 2 to limit axial movement of the spindle 12 and wheel 1 with respect to the body 2. The thrust washer 17 is held in place by a machine screw 18 screw threaded into a threaded axial opening in the spindle 12.

The shank 3 comprises an inner shank section 19, an intermediate shank section 20, and an outer shank section 21 connected together by toggle linkages for movements between operative positions in alignment with each other, as shown in FIG. 2, and inoperative folded or collapsed storage positions, as shown in FIG. 1. The shank 3 is disposed in a plane substantially parallel to the plane of the wheel 1, the inner shank section 19 being of generally U-shape, having its intermediate portion welded or otherwise rigidly secured to the tubular body or bearing 2, as indicated at 22. The outer shank section 21 includes an angularly displaced outer end portion 23 on which is mounted a handle 24. Preferably, the shank sections 19–21 are formed from cross sectionally rectangular metallic tubing, the intermediate shank section 20 being a straight length of tubing.

The inner end of the intermediate shank section 20 is connected to the outer end of the inner shank section 19 by a toggle link assembly 25, the outer end of the intermediate section 20 being similarly connected to the inner end of the outer section 21 by a toggle link assembly 26 identical to the assembly 25. Each assembly 25 and 26 comprises two pairs of toggle links 27 and 28 having inner ends pivotally connected together by rivets or like fasteners 29. Each toggle link 28 is formed to provide an angularly displaced flange 30 that is connected, by means of a rivet 31, to an adjacent end of a cross bar 32 which connects the two pairs of toggle links of each assembly 25 and 26 together for common operation. The cross bars 32 also act as stop members as will hereinafter appear. The outer ends of the toggle links 27 are shown as being pivotally secured to the inner end portions of the shank sections 21 and 20 by means of rivets or like pivot pins 33 that extend transversely through their respective shank sections and through plug elements or portions 34 that project longitudinally outwardly from the inner ends of their respective shank sections 20 and 21. In like manner, the outer ends of the toggle links 28 are pivotally secured to opposite sides of the shank sections 19 and 20 adjacent their outer ends, by rivets or the like 35. The rivets 35 also extend through plug-like reinforcing members 36 within the sections 19 and 20, these cooperating with the adjacent ends of their respective shank sections to define longitudinally outwardly opening recesses 37. The rivets 29, 33 and 35 of both toggle link assemblies 25 and 26 are disposed on parallel axes extending transversely of the shank 3 and generally parallel to the axes of the spindle 12.

As shown in FIGS. 1 and 2, the toggle link assemblies 25 and 26 are so arranged that the shank sections 20 and 21 may be moved relative to each other and the shank section 19 between collapsed or folded positions wherein the sections are angularly displaced form each other, and operative positions wherein the shank sections 20 and 21 are in alignment with each other and with the engaged portion of the inner shank section 19. In the folded position of the sections, a portion of the outer shank section 21 is disposed in side-by-side engagement with the angularly displaced inner end portion 38 of the inner shank section 19. The shank sections 20 and 21 are releasably locked in their folded positions by means of a latch 39 that is pivotally mounted on the outer shank section 21 and yieldingly urged into engagement with a cooperating strike-acting pin 40 by means of a leaf spring 41, see particularly FIGS. 1 and 8. It will here be noted that the several shank sections 19–21 are of such length and shape that, when the shank 3 is folded, the sections 19–21 are all contained within a circle described by the outer circumference of the wheel 1. When the latch 39 is released from engagement with the pin 40, the shank sections 20 and 21 may be swung relative to each other and to the shank section 19 to bring the shank sections into alignment. During movement of the shank sections 19–21 into alignment, the plug portions or elements 34 are inserted into their respective recesses 37 in which they have snug fitting engagement, to lock the sections against movement away from their aligned dispositions. As shown in FIGS. 2 and 5, the toggle links 27 and 28 are pivotally moved during insertion of the plug portions 34 into the recesses 37 so that, when the insertion is complete, the toggle links 28 are disposed in superposed relationship to their respective toggle links 27, and in alignment with the shank 3. The cross bars 32 engage their adjacent sides of the shank sections 20 and 21 to limit swinging movement of the toggle links 27 and 28 beyond their superposed disposition relative to each other. When it is desired to re-fold the shank 3, the laterally outwardly projecting flanges 30 provide gripping surfaces whereby the toggle links may be swung in directions to cause disengagement of the plug portions 34 from their respective recesses 37.

The counter 4 includes conventional counter mechansm, not shown, but including a rotary input shaft 42, a viewing window 43 and a reset knob 44. The counter 4 is mounted on a supporting base 45 that is welded or otherwise rigidly secured to the tubular body 2. The counter 4 is protected from being struck by objects in the field, and during storage or shipment, by a pair of laterally spaced upstanding shield elements 46. Means for driving the shaft 42 comprises a spur gear 47 that is mounted fast on the shaft 42 of the counter 4 and which has meshing engagement with the pinion 13. The pinion 13 and gear 47 are protected from foreign matter by a housing 48 comprising cooperating generally cylindrical housing sections 49 and 50, the former of which is rigidly secured to the hub 5 of the wheel 1, and the latter of which is welded or otherwise rigidly secured to the body 2 and intermediate portion of the inner shank section 19. As shown in FIG. 4, the housing sections 49 and 50 have overlapping cylindrical walls, the section 49 rotating with the wheel 1 and relative to the housing section 50.

The diameter of the wheel 1 and the ratio between the pinion 13 and gear 47 are such that the exact number of feet traveled by the instrument over a field is registered in the window 43 of the counter 4. In a commercial measuring instrument produced in accordance with this invention, the measuring wheel 1 has an outer circumference of precisely five feet, giving the same a diameter of approximately 19⅛⅛ inches. The overall axial dimension of the commercial instrument is approximately four inches. Thus, it can be seen that the instrument of this invention can be stored in a relatively small space and conveniently shipped. By making the wheel 1 with stampings and the shank from metalic tubing, the entire structure is very light in weight and easily handled.

This invention has been thoroughly tested and found to be completely satisfactory for the accomplishment of the objectives set forth; and, while I have shown and described a preferred embodiment of my land measuring instrument, it will be understood that the same is capable of modification without departure from the spirit and scope of the invention, as defined in the claims.

What is claimed is:
1. A land measuring instrument comprising:
   a. a wheel supported body;
   b. a ground engaging wheel of given diameter;
   c. spindle means journalling the wheel on said body for rotation on a normally generally horizontal axis;
   d. a counter carried by said body;
   e. actuator means operatively connected to said wheel for operating said counter responsive to rotation of the wheel;
   f. wheel guiding and impelling means connected to said body and comprising an elongated shank having a handle at one end, said shank including a least a pair of shank sections in end to end relationship;
   g. means connecting said shank sections at adjacent ends thereof for movements relative to each other between inoperative collapsed positions and operative positions in aligned end to end relationship, and comprising toggle links having inner ends pivotally secured together on an axis extending transversely of the shank, and outer ends each pivotally connected to the adjacent end of a different shank section on an axis parallel to said transversely extending axis;
   h. and means for releasably locking said shank sections rigidly in said operative positions;
   i. each of said shank sections having a length and shape to be confined within a circle defined by the outer circumference of the wheel when said sections are in said inoperative collapsed positions thereof.

2. The land measuring instrument defined in claim 1 in which said body includes a tubular bearing, said spindle means comprising a spindle element mounted fast in said wheel and projecting axially therefrom for common rotation with the wheel, said spindle element being journaled in said bearing, said actuator means comprising a toothed pinion on said spindle element, characterized by a gear on said counter having meshing engagement with said pinion; and a pair of housing sections, one mounted on said wheel and the other on said body, said sections cooperating to enclose said gear and pinion.

3. The land measuring instrument defined in claim 1 in which said means for locking the shank sections in said aligned operative positions comprises a longitudinally outwardly projecting locking plug portion on the end of one of said shank sections, the other shank section having a longitudinally outwardly opening recess for snug reception of said locking plug portion, said toggle links being movable to positions relative to each other and said shank sections to hold said plug portion in said recess.

4. The land measuring instrument defined in claim 3 in which said toggle links are arranged to be disposed in superposed parallel relationship when said locking plug portion is received in said recess, characterized by a stop element on said toggle links engaging one of said shank sections to limit pivotal movements of said toggle links in one direction beyond said superposed relationship.

5. The land measuring instrument defined in claim 4 in which said means for releasably locking the shank sections in said aligned operative positions comprises a locking plug portion projecting longitudinally outwardly from one end of one of the sections of each pair of toggle link connected shank sections, the end of the other section of each said pair thereof having a longitudinally outwardly opening recess for snug reception of its respective locking plug portion, the toggle links of each pair thereof being movable to positions relative to each other to hold their respective plug portions in the recesses therefor.

6. The land measuring instrument defined in claim 4 in which said inner shank section has an inner end portion disposed in side by side engagement with a portion of said outer shank section when said shank sections are moved to there inoperative collapsed positions, characterized by cooperating latch elements on said shank portions for releasably locking said shank sections in said inoperative positions thereof.

7. A land measuring instrument comprising:
a. a wheel supported body;
b. a ground engaging wheel of given diameter
c. spindle means journalling the wheel on said body for rotation on a normally generally horizontal axis;
d. a counter carried by said body;
e. actuator means operatively connected to said wheel for operating said counter responsive to rotation of the wheel;
f. wheel guiding and impelling means connected to said body and comprising an elongated shank having a handle at one end, said shank including longitudinally inner, intermediate, and outer sections each having inner and outer ends, said inner section being rigidly secured to said body, said outer section having said handle on its outer end;
g. means connecting said shank sections at adjacent ends thereof for movements relative to each other between inoperative collapsed positions and operative positions in aligned end to end relationship, and comprising pairs of cooperating toggle links having inner ends pivotally secured together and outer ends connecting the opposite ends of said intermediate section to the outer end of said inner section and the inner end of said outer section respectively on parallel axes extending transversely of said shank;
h. and means for releasably locking said shank sections rigidly in said operative positions;
i. each of said shank sections having a length and shape to be confined within a circle defined by the outer circumference of the wheel when said sections are in said inoperative collapsed positions thereof.

* * * * *